United States Patent
Harris et al.

(10) Patent No.: US 10,362,040 B2
(45) Date of Patent: Jul. 23, 2019

(54) MULTI-SECURITY LEVELS/TRAFFIC MANAGEMENT ACROSS MULTIPLE NETWORK FUNCTION INSTANTIATIONS

(71) Applicant: NOKIA SOLUTIONS AND NETWORKS OY, Espoo (FI)

(72) Inventors: John Harris, Whitefish Bay, WI (US); Umamaheswar Kakinada, Carpentersville, IL (US); Guenther Horn, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 66 days.

(21) Appl. No.: 15/570,646

(22) PCT Filed: Apr. 30, 2015

(86) PCT No.: PCT/US2015/028533
§ 371 (c)(1),
(2) Date: Oct. 30, 2017

(87) PCT Pub. No.: WO2016/175835
PCT Pub. Date: Nov. 3, 2016

(65) Prior Publication Data
US 2018/0295138 A1    Oct. 11, 2018

(51) Int. Cl.
*H04L 29/06*    (2006.01)
(52) U.S. Cl.
CPC ............ *H04L 63/105* (2013.01); *H04L 63/20* (2013.01)
(58) Field of Classification Search
CPC .................................................. H04L 63/105
See application file for complete search history.

(56) References Cited

U.S. PATENT DOCUMENTS

| 7,937,761 | B1 * | 5/2011 | Bennett | H04L 63/1433 |
| | | | | 713/153 |
| 8,880,869 | B1 * | 11/2014 | Shah | H04W 76/14 |
| | | | | 713/151 |

(Continued)

FOREIGN PATENT DOCUMENTS

| JP | 2009055381 A | 3/2009 |
| JP | 2011520161 A | 7/2011 |

OTHER PUBLICATIONS

Al-Nashif et al.; Multi-Level Intrusion Detection System (ML-IDS); Published in: 2008 International Conference on Autonomic Computing; Date of Conference: Jun. 2-6, 2008; IEEE Xplore (Year: 2008).*

(Continued)

*Primary Examiner* — Bradley W Holder
(74) *Attorney, Agent, or Firm* — Squire Patton Boggs (US) LLP (57) ABSTRACT

Certain example embodiments may generally relate to multi-security levels/traffic management across multiple network function instantiations, including virtualized network function instantiations. A method may include configuring a first instantiation of a first network function to provide a first type of security. The method may also include configuring a second instantiation of the first network function to provide a second type of security that is different than the first type of security. The method may further include allocating at least some of the subscriber traffic to the first instantiation.

15 Claims, 5 Drawing Sheets

(56) References Cited

U.S. PATENT DOCUMENTS

| | | | | |
|---|---|---|---|---|
| 9,319,913 | B2* | 4/2016 | Raleigh | H04L 41/0893 |
| 2004/0235452 | A1* | 11/2004 | Fischer | H04L 63/104 |
| | | | | 455/410 |
| 2007/0124244 | A1* | 5/2007 | Mock | G08G 1/207 |
| | | | | 705/50 |
| 2009/0059878 | A1 | 3/2009 | Tamura | |
| 2009/0205046 | A1 | 8/2009 | Radosavac et al. | |
| 2011/0161657 | A1* | 6/2011 | So | H04L 29/12207 |
| | | | | 713/153 |
| 2012/0182867 | A1* | 7/2012 | Farrag | H04W 28/0236 |
| | | | | 370/230 |
| 2013/0042298 | A1* | 2/2013 | Plaza Fonseca | G06F 21/335 |
| | | | | 726/1 |
| 2014/0153481 | A1 | 6/2014 | Draznin et al. | |
| 2015/0055652 | A1* | 2/2015 | Yong | H04L 12/184 |
| | | | | 370/390 |
| 2016/0255118 | A1* | 9/2016 | Wang | H04L 63/1441 |
| | | | | 726/1 |
| 2017/0147977 | A1* | 5/2017 | Jamula | G06Q 10/08 |

OTHER PUBLICATIONS

Karagiannis et al.; BLINC: multilevel traffic classification in the dark; Published in:Proceeding; SIGCOMM '05 Proceedings of the 2005 conference on Applications, technologies, architectures, and protocols for computer communications pp. 229-240; 2005; ACM Digital Library (Year: 2005).*

Japanese Office Action application No. 2017-556825 dated Nov. 26, 2018.

TD SP-140278, New WID: Dedicated Core Networks {Decor}, 3GPP TSG SA Meeting #64, Sophia Antipolis, France, Jun. 16-18, 2014.

International Search Report and Written Opinion dated Jan. 18, 2016, corresponding to International Patent Application No. PCT/US2015/028533.

Basile Cataldo et al., "A novel approach for integrating security policy enforcement with dynamic network virtualization", Proceedings of the 2015 1st IEEE Conference on Network Softwarization (Netsoft), IEEE, Apr. 13, 2015, pp. 1-5, XP032782095.

* cited by examiner

Figure 1

|  | MME/Control Plane | Bearer Plane (S-GW, DPI, App. Opt.) | SGi (Interface from PDN & App Server) | Example Usage Case |
| --- | --- | --- | --- | --- |
| Scenario A | Lower/ Best effort / Don't care | Lower | Lower/ Best effort / Don't care | Netflix to home |
| Scenario B | Higher | Lower/ Best effort / Don't care | Lower/ Best effort / Don't care | Pandora with location privacy |
| Scenario C | Lower/ Best effort / Don't care | Higher | Higher | Financial transaction at bank |
| Scenario D | Higher | Higher | Higher | VoLTE call (with mobility & privacy) |

MULTI-SECURITY LEVELS/TRAFFIC MANAGEMENT ACROSS MULTIPLE NETWORK FUNCTION INSTANTIATIONS

BACKGROUND

Field

Example embodiments of the invention generally relate to mobile communications networks, such as, but not limited to, the Universal Mobile Telecommunications System (UMTS) Terrestrial Radio Access Network (UTRAN), Long Term Evolution (LTE) Evolved UTRAN (E-UTRAN). For example, some example embodiments relate to multi-security levels/traffic management across multiple network function instantiations, including virtualized network function instantiations.

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node-Bs. The RNC and its corresponding Node-Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and multimedia transport in addition to high-capacity voice support. Advantages of LTE include, for example, high throughput, low latency, FDD and TDD support in the same platform, an improved end-user experience, and a simple architecture resulting in low operating costs. In addition, LTE is an all internet protocol (IP) based network, supporting both IPv4 and Ipv6.

SUMMARY

One example embodiment is directed to a method to allocate subscriber traffic, which may include configuring a first instantiation of a first network function to provide a first type of security. The method may also include configuring a second instantiation of the first network function to provide a second type of security that is different than the first type of security. The method may further include allocating at least some of the subscriber traffic to the first instantiation.

In an example embodiment, the allocation of the subscriber traffic to the first instantiation may be based on a security need of the first network function. In another example embodiment, the method may further include prioritizing handling of a first subscriber's traffic by the first instantiation of the first network function, and prioritizing handling of a second subscriber's traffic by the second instantiation of the first network function.

According to an example embodiment, the first type of security and the second type of security may each be configured based on at least one of: a per user, per subscriber, or per enterprise policy, payment for a specific level of security, or the first and second subscriber's current context. According to another example embodiment, the first type of security may relate to a mobility management entity network function, and the second type of security may relate to a bearer plane security.

In an example embodiment, the level of security associated with the first network function may include a network vendor whitelist/blacklist policy, or a geographic or distance policy, a higher level of security that is run entirely inside an operator's network, a degradation of the level of security based on the number of third-party applications running on the same hardware with the first network function, and a degradation of the level of security when a hardware platform hosting the first network function based on the dynamic changes of the hardware platform. In another example embodiment, the level of security provided to the first network function may be provided based on at least one of: third party access to a network element; the operator network's back-haul or side-haul is wireless; presence of radio access network sharing of the network element; presence of multipoint transmission; a trust level corresponding to a Wi-Fi; and a number of user equipments connected to the network element.

Another example embodiment is directed to an apparatus for allocating subscriber traffic, which may include at least one processor, and at least one memory including computer program code. The at least one memory and the computer program code may be configured, with the at least one processor, to cause the apparatus at least to configure a first instantiation of a first network function to provide a first type of security. The at least one memory and the computer program code may also be configured, with the at least one processor, to configure a second instantiation of the first network function to provide a second type of security that is different than the first type of security. The at least one memory and the computer program code may further be configured, with the at least one processor, to allocate at least some of the subscriber traffic to the first instantiation.

In an example embodiment, the allocation of the subscriber traffic to the first instantiation is based on a security need of the first network function. In another example embodiment, the at least one memory and the computer program code may be configured, with the at least one processor, to cause the apparatus at least to prioritize handling of a first subscriber's traffic by the first instantiation of the first network function, and prioritize handling of a second subscriber's traffic by the second instantiation of the first network function.

According to an example embodiment, the first type of security and the second type of security may each configured based on at least one of: a per user, per subscriber, or per enterprise policy, payment for a specific level of security, or the first and second subscriber's current context. According to another example embodiment, the first type of security may relate to a mobility management entity network function, and the second type of security may relate to a bearer plane security.

In an example embodiment, the level of security associated with the first network function may include: a network vendor whitelist/blacklist policy, or a geographic or distance policy; a higher level of security that is run entirely inside an operator's network; a degradation of the level of security based on the number of third-party applications running on the same hardware with the first network function; and a degradation of the level of security when a hardware platform hosting the first network function based on the dynamic changes of the hardware platform. In another example embodiment, the level of security provided to the first network function may be provided based on at least one of: third party's access to a network element; the operator network's back-haul or side-haul is wireless; presence of radio access network sharing of the network element; presence of multipoint transmission; a trust level corresponding to a Wi-Fi; and a number of user equipments connected to the network element.

Another example embodiment is directed to an apparatus for allocating subscriber traffic, which may include configuring means for configuring a first instantiation of a first network function to provide a first type of security. The apparatus may also include configuring means for configuring a second instantiation of the first network function to provide a second type of security that is different than the first type of security. The apparatus may further include allocating means for allocating at least some of the subscriber traffic to the first instantiation.

In an example embodiment, the apparatus may include prioritizing means for prioritizing handling of a first subscriber's traffic by the first instantiation of the first network function, and prioritizing means for prioritizing handling of a second subscriber's traffic by the second instantiation of the first network function. In another example embodiment, the first type of security and the second type of security may each configured based on at least one of: a per user, per subscriber, or per enterprise policy, payment for a specific level of security, or the first and second subscriber's current context.

According to an example embodiment, the first type of security may relate to a mobility management entity network function, and the second type of security may relate to a bearer plane security. According to another example embodiment, the level of security associated with the first network function may include: a network vendor whitelist/blacklist policy, or a geographic or distance policy; a higher level of security that is run entirely inside an operator's network; a degradation of the level of security based on the number of third-party applications running on the same hardware with the first network function; and a degradation of the level of security when a hardware platform hosting the first network function based on the dynamic changes of the hardware platform.

In an example embodiment, the level of security provided to the first network function may be provided based on at least one of: third party's access to a network element; the operator network's back-haul or side-haul is wireless; presence of radio access network sharing of the network element; presence of multipoint transmission; a trust level corresponding to a Wi-Fi; and a number of user equipments connected to the network element.

Another exemplary embodiment is directed to a computer program, embodied on a non-transitory computer readable medium, the computer program configured to control a processor to perform the method according to any one of the methods described above.

BRIEF DESCRIPTION OF THE DRAWINGS

For proper understanding of the invention, reference should be made to the accompanying drawings, wherein.

DETAILED DESCRIPTION

The features, structures, or characteristics of the invention described throughout this specification may be combined in any suitable manner in one or more example embodiments. For example, the usage of the phrases "certain example embodiments," "some example embodiments," or other similar language, throughout this specification refers to the fact that a particular feature, structure, or characteristic described in connection with the example embodiment may be included in at least one example embodiment of the present invention.

Thus, appearances of the phrases "in certain example embodiments," "in some example embodiments," "in other example embodiments," or other similar language, throughout this specification do not necessarily all refer to the same group of example embodiments, and the described features, structures, or characteristics may be combined in any suitable manner in one or more example embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and example embodiments of this invention, and not in limitation thereof.

It may be desirable to enable delivery of the most appropriate levels of security while simultaneously exploiting the maximum benefits of network function virtualization in the cloud. This may include, for example, exploiting the multiplexing gains possible within cloud environments. However, problems may arise in determining how to enable security which meets the needs of subscribers, while also maximizing the profitability and efficiency as network functions move more and more towards networks function virtualization in the cloud. Some users will likely have higher security requirements than others.

For example, there may be a first group of users for which security is relatively important, and the cost of communication services is relatively unimportant. Conversely, there may be a second group of users for which security is relatively unimportant, and the cost of communication services is relatively important.

In another example, for a single user, it may be that in certain contexts (e.g., when there is particularly sensitive or private information being exchanged over the communication link), security may be relatively important at that time. In contrast, at other times or in other contexts, security may be relatively unimportant, and network efficiency may be more important.

As cellular networks migrate towards the cloud and network function virtualization, a number of unique opportunities arise. For example, in a first network function (e.g., mobility management entity (MME) or serving gateway (SGW) functionality), there may likely be multiple instantiations of that network function which can service a given subscriber, for example, with reasonable latency but where the first instantiation is the most efficient from a network/cloud capacity perspective (and is provided at a correspondingly low cost to the operator) but also provides a lower level of security. This is in contrast with a second instantiation that is less efficient from a network/cloud capacity perspective (and somewhat higher cost), which also provides a higher level of security. In this context, there may be a need for a proprietary and/or standards based mechanism that enables delivering the appropriate levels of security, while simultaneously maximally exploiting the benefits of network function virtualization in the cloud, for example, exploiting the multiplexing gains possible within cloud environments.

Certain example embodiments of the present invention may be directed to a proprietary and/or standards mechanism in which there are at least two instantiations of a first network function. The first instantiation may provide a higher level of security than a second instantiation of the same network function, and in response to a first communication network element/third network function that detects that a first subscriber has a higher security requirement than a second subscriber, performing the prioritization of handling of a first subscriber's traffic by the first instantiation.

There is a need for solutions which exploit and leverage knowledge of many different levels of security, including security requirements, across the cloud and cloud usage environments. With this in mind, certain example embodiments of the present invention may operate within this general area. More specifically, certain example embodiments may enable the delivery of broad, but also specific, solutions and example embodiments with standards addressed, where the most appropriate levels of security are delivered while simultaneously maximally exploiting the benefits of network function virtualization in the cloud. The exploitation may also include exploiting the multiplexing gains possible within cloud environments.

An overarching problem that is addressed by example embodiments of the invention is how to enable security which best meets the needs of subscribers, while also maximizing the profitability and efficiency as network functions move more and more towards networks function virtualization in the cloud. More specifically, capturing more and more of the benefits of leveraging the cloud and network function virtualization may necessarily create a wider range of levels of security than has been traditionally the case where the mobile network operators' equipment was entirely within their control including the special purpose built hardware solutions. For example, in the shared environment, there may be many more "touch points," for example, as a result of multi-tenancy where the security perimeter of exposure can be dramatically increased. With dynamic provisioning, this level exposure can further be varied across a number of different dimensions.

As previously discussed, the problem is to enable achieving the absolute maximum benefits of the shift towards the cloud/network function virtualization, while providing the right level of security. It is possible to provide yet higher levels of security, but the highest levels generally involve additional costs, and many cases can result in loss of some of the benefits of the cloud and network function virtualization. For example higher levels of security can be achieved through even higher levels of access control and monitoring, through the use of hardware or software that underwent a formal certification process through the use of tamper-resistant hardware, Trusted Platform Modules (TPMs) or through locating servers in a physically controlled environment.

However, not all traffic has equivalent needs in this area. For example, consider video/audio streaming traffic (e.g., Netflix®, Pandora®, Spotify®, which often compose the majority of the traffic on commercial communication networks), which may not require as high of level of security. As a result the capacity impact of this large fraction of the traffic can be reduced even more significantly, while not impacting the security level provided to other relatively sensitive types of traffic.

If for example, providing the most secure cloud environment for a network function doubles the cost of that network function on a per traffic or per subscriber basis, then by using the most secure network functions for only the traffic requiring it, it may be possible to significantly improve the overall capacity or cost of the cloud solution for network functions. For example, the overall capacity or cost may be reduced by 50% or more, where video/audio streaming is typically the majority of the traffic volume carried by wireless networks today.

Some users may likely have higher security requirements than others. For example, there may be a first group of users for which security is relatively important, and the cost of communication services is relatively unimportant. Conversely, there may be a second group of users for which security is relatively unimportant, and the cost of communication services is relatively important. In another example, for a single user, it may be that in certain contexts (e.g., when there is particularly sensitive or private information being exchanged over the communication link), security may be relatively important at that time. In contrast, at other times or in other contexts, security may be relatively unimportant, and network efficiency may be more important.

As cellular networks migrate towards the cloud and network function virtualization, a number of unique opportunities arise. Specifically, although there are efforts to create isolation on the cloud in the context of shared hardware environments, it is also clear that there is a trade-off between achieving the absolutely largest benefits from the cloud (as discussed above in terms of capacity, capital expenditures (CAPEX), operation expenditures (OPEX), etc.) and delivering the highest levels of security and trust, for example with the most robust approaches to isolation, with respect to such shared hardware environments.

For example, with respect to a first network function (for example, an MME or serving Gateway or deep packet inspection (DPI) or application optimization functionality) there may likely be multiple instantiations of that network function which can service a given subscriber, for example with reasonable latency. There may be one instantiation inside the operator's traditional network, running on the traditional network vendor's hardware, for example.

A second instantiation of the first network function may be running on the cloud on a hardware provided by a "trusted" hardware vendor, where all of the computational software on that hardware is also "known." A third instantiation of the first network function may be running on the cloud on hardware provided by a un-trusted third-party, where that same hardware is also running an even larger number of other computational software created by an unknown un-trusted set of third-party application providers. In this case it may be that the expected level of security is highest on the first instantiation, lower on the second instantiation, and lowest on the third instantiation. However, in this example, due to the greater multiplexing gains, the third instantiation is the most efficient from a network/cloud capacity perspective (and is provided at a correspondingly low cost to the operator), where the second instantiation is less efficient from a network/cloud capacity perspective (and is somewhat higher cost), and the first instantiation is likely the network that is efficient and has the highest cost.

An example where the geographical location of the hardware may matter is lawful interception (LI). It may be important that a point of interception is located within an area where a particular jurisdiction applies. Another related example may be services where a provider "guarantees" to the subscriber that the service is executed solely by servers residing in a particular country or region. This may include, for example, email providers or web hosting services that "guarantees" that email between two residents of a country stays within that country.

In this context, there is a need for specific enablers and mechanisms to allow network operators to deliver appropriate levels of security and trust, while simultaneously exploiting the maximum benefits of network function virtualization in the cloud, including, for example, by exploiting the multiplexing gains possible within cloud environments where there may be little or no power over the underlying resources.

Figure 1:
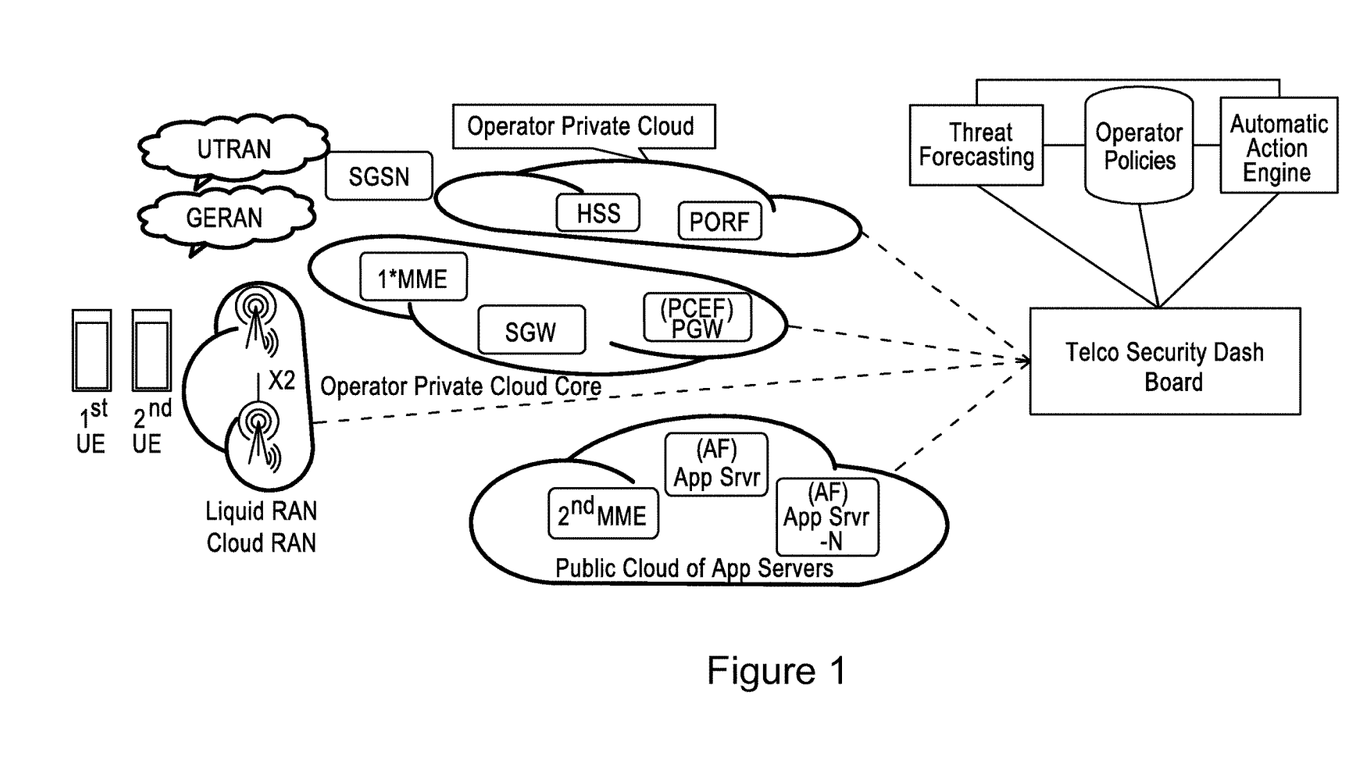
FIG. 1 illustrates an example system diagram, according to certain example embodiments.

FIG. 1 shows an example system diagram, according to certain example embodiments. The system may include first and second UEs, UTRAN, global system for mobile communications (GSM) enhanced data rates for GSM evolution (EDGE) radio access network (GERAN), and a serving general packet radio service support node (SGSN). The system may also include network elements in an operator private cloud core and a public cloud of application servers that interact with a telco security dash board. The system may further include a telco security dash board to which a threat forecasting module, operator policies, and automatic action engine are connected.

According to an example embodiment, a method may be provided to manage assignment of subscriber traffic to network function instantiations. This management/selection function may be done in the MME, which can select the specific instantiations Serving/Packet Data Network Gateway (S/P-GW) network function, and identify Internet access routers/offload points to provide the necessary security for different user plane streams for the subscriber, or all the traffic for a given subscriber. This can then use the security policies/awareness of the network functions, in combination with the currently available selection framework to assign subscribers or their data streams to certain instantiation of network functions, for example, based on their security needs. In this case, the selection may additionally be based upon the subscriber profile from the home subscriber server (HSS), the device type information, the device and/or application software version, the security capabilities of the device, the security needs of the device (e.g., based on a security mode command), and/or the international mobile equipment identity (IMEI) and IMEI software version (IMEISV) can be used by the MME. This can then impact the selection of the S/P-GW. In another example embodiment, the eNB can perform the management/selection function wherein it uses the discussed criteria to select the instantiation of the MME network function to be used.

In an example embodiment, there may be at least two instantiations of a first network function. In an example embodiment, the management of subscriber traffic may be performed by a network function or security orchestrator. The network function, as used herein, may include, but not limited to, for example, an MME, SGW, policy charging rules function (PCRF), DPI or application optimization functionality, or SGi reference point in LTE (3GPP reference point between the PDN GW and the packet data network), or other similar or like elements.

The first instantiation may provide a different type of security than the second instantiation of the same network function. For example, in an example embodiment, the first instantiation of the first network function may provide a first type of security, while the second instantiation of the first network function provides a second type of security. For instance, the first instantiation may have a higher level of security than a second instantiation of the same network function, in which the second instantiation of the network function provides a second type (e.g., a lower or best effort level) of security.

According to another example embodiment, there may be a second network function that includes a decision function that allocates some or all subscriber traffic to a given instantiation of the first network function. In an example embodiment, the second network function may include a management function. It may be that the allocation of a function to a given instantiation does not depend on subscriber profiles at all, such as, for example, in the LI case, where interception is located within an (geographic) area where a particular (lawful) jurisdiction applies, thereby so that the of the assigned network function is decided based on its a physical location corresponding to the intercepted call.

According to an example embodiment, the decision of the second network function may depend on the response by a third network function detecting that a first subscriber has a first type of security requirement, such as a higher security requirement, than a second subscriber with a second type of requirement, such as a lower security requirement. Further, handling of a first subscriber's traffic by the first instantiation of the first network function may be prioritized. Additionally, handling of the second subscriber by the second instantiation of the first network function may also be prioritized.

According to an example embodiment, the first subscriber may receive a service with a first type of security that is a higher level relative to that of the second subscriber, for example. Further, the first subscriber may receive the service based on (or as a result of) at least one of multiple factors.

First, the first subscriber may receive the service with the first type of security based on a per user or per subscriber, or per enterprise policy. Second, the first subscriber may receive the service with the first type of security based on the first subscriber (or the first subscribers enterprise) paying for a higher level of security. For example, the first subscriber may pay for a higher level of service in order to receive a service with a higher level of security, relative to that of the second subscriber.

Third, the first subscriber may receive the service with the first type of security based on a policy determining that the first subscriber's traffic needs the first type of security at least partially as a function of the subscriber's current context. The subscriber's current context may be based on the type of application/service, app, location, or called party, for example. For instance, a phone call to a sensitive work contact may require a different/higher level of security than a phone call to a family member or friend.

In another example, a financial transaction, or a "private" Facebook® video message may require a different level of security than a data session with a streaming music/video from Netflix®, Pandora® or Spotify®, or a broadcast Facebook® message or YouTube® video upload or download which is accessible by the entire world. Each application may have a different security level attribute associated with it (provided/settable by the app, the operating system (OS), an application server and/or the user. Further, each piece of media may additionally have different security level attributes associated with it in its metadata including, for example, the Facebook® example mentioned above, or consider a "private" flagged calendar item.

In another example embodiment, there may be three levels: (1) trusted Wi-Fi, which is Wi-Fi provided by the operator; (2) un-trusted Wi-Fi; and (3) cellular.

According to an example embodiment, the management of assigning subscriber traffic to network function instantiations may be enabled by one or more of the following example embodiments for differentiating different types of security.

In an example embodiment, the type of security may include at least one of the following. A first type of security relating to an MME network function, including call control signaling, and access to UE (cell visited) history, etc., for example.

The type of security may also include a second type of security having to do with bearer plane security, including serving gateway choice, for example. The type of security may impact the selection of the gateway, but the MME function selection may not be impacted by the security type requested. In this example, the signaling may first go to the MME, after which the type of security required then impacts the bearer plane handling/gateway selection. Furthermore, there may be a "profile" of each network function indicating what type of security risk it can create, including call control, and location, for example.

Figure 2:
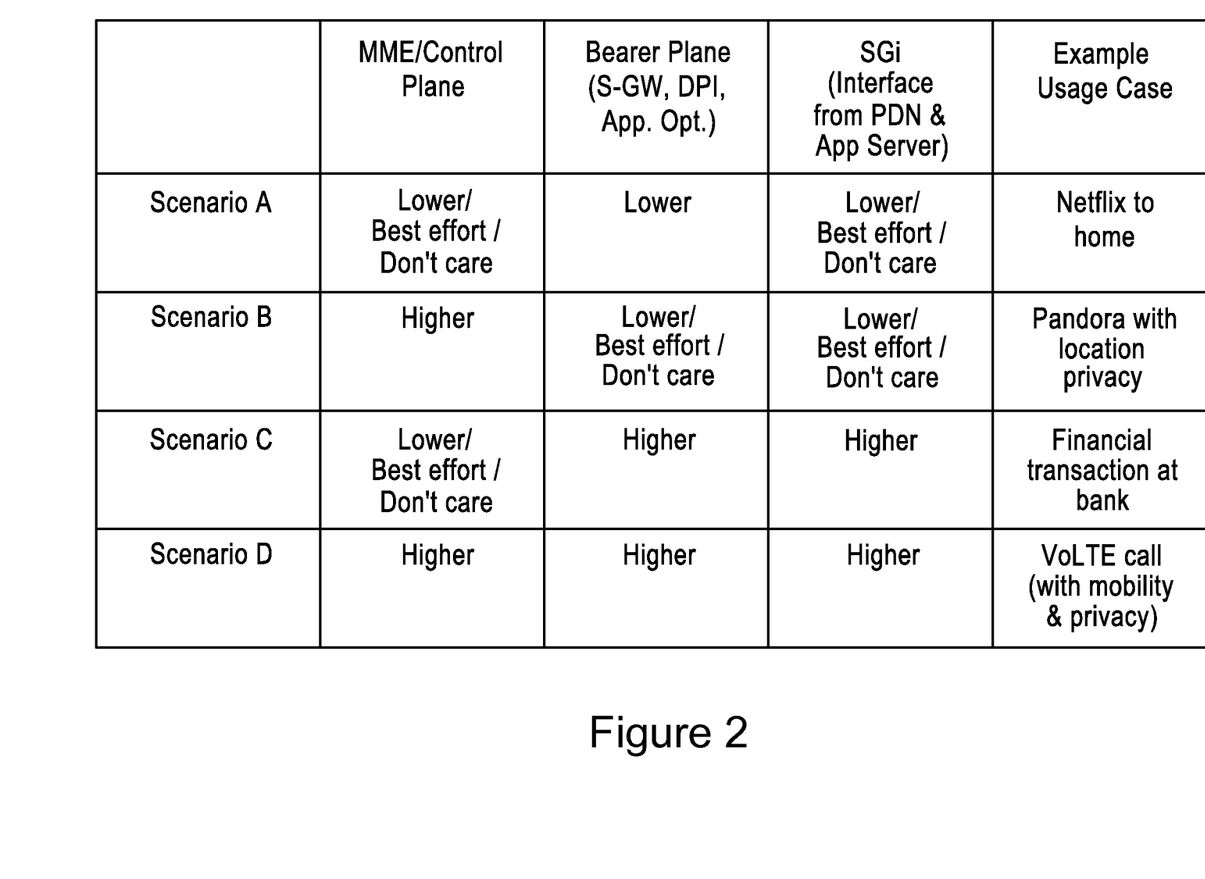
FIG. 2 illustrates an example with different types or dimensions of security, with each dimension having multiple values, according to certain example embodiments

FIG. 2 illustrates an example with different types or dimensions of security, with each dimension having multiple values, according to certain example embodiments. In particular, FIG. 2 illustrates Scenarios A-D, and each scenario's corresponding security type with respect to MME/control plane, bearer plane, SGi, and example usage case.

According to an example embodiment, the management of assigning subscriber traffic to network function instantiations may be enabled by one or more of the following example embodiments leveraging various elements.

In one example embodiment there may be a dedicated core example embodiment leveraging a dedicated 3GPP core where each dedicated core network is dedicated to UEs sharing certain characteristics. The dedicated core network may support the different needs and characteristics of machine type devices. In the context of certain example embodiments of the present invention, this may be used to enable the security requirement criteria to associate the subscriber/traffic with the appropriate subset of the larger core network with the appropriate security level. This may also include expanding the list of device type attributes to include the different dimensions and aspects of security.

The solution to manage assignments of subscriber traffic to network function instantiations may, according to certain example embodiments, leverage example embodiments expanding upon quality of service (QoS) to provide a quality of security (QoSec). This leveraging may include leveraging of the PCRF to further enable a more dynamic level of security on a per flow basis (as opposed to a more static per device basis), for example. Additionally, the leveraging may also include expansion of the list of QoS attributes to include the different dimensions and aspects of security, such as those described above and shown in FIG. 2.

A solution to manage assignments of subscriber traffic to network function instantiations may, according to certain example embodiments, further leverage DPI to determine and better estimate the levels of security and/or trust required. In another example embodiment, the solution may leverage an example embodiment using a separate access point name (APN) for different types of security. In yet another example embodiment, the solution may leverage an example embodiment in which the type of security required as part of the subscriber profile, for example, can impact SGW choice.

According to an example embodiment, the solution may leverage an example embodiment in which different public land mobile networks (PLMNs) corresponds to different types or levels of security. In other words the solution may be enabled by leveraging radio access network (RAN) sharing technology, for example, with PLMN values mapping to partially overlapping portions of the network. Further, the EnodeB (eNB) may have a multiple core access, where routes/core selection is based on the PLMN (or device type).

According to an example embodiment, the solution may leverage an example embodiment in which the device authenticates (and verifies) that the serving portion of the network is associated with higher security. The authentication (and verification) may use at least one of security certificates, or a pre-configuration of the UE with a list, or possibly leveraging additional device type identifications (IDs)/machine type communication (MTC) device type ability to identify the appropriate subset of the core, as per the dedicated core work item described above.

The first network instantiation mentioned above, may be a network instantiation which has been identified, for example, as having the appropriate network security type based upon its classification as being sufficiently high security to perform lawful intercept.

According to an example embodiment, the level of security associated with a particular network function running on a particular network hardware platform on the cloud may include a network vendor white list/blacklist policy, or a geographic or distance policy. For example, the first subscriber or subscribers' enterprise may require that it exclude or preferably avoid using network functions running on hardware from particular vendors (e.g., vendors on a blacklist, or vendors where subscribers in that country believe there is a security risk).

It may be that two different subscribers in the same system may have two different blacklists. For example, a first subscriber may wish to avoid their traffic passing through a network function on hardware provided by a first country (e.g., a subscriber from country X might want to avoid having the traffic pass through hardware provided by a vendor from the US), while a second subscriber may wish to avoid traffic passing through a network function provided by a second country. (e.g., a subscriber from the country Y may want to avoid having the traffic pass through hardware provided by a vendor based in China). These country examples are just examples, and are in no way an endorsement of any particular such list of countries.

Furthermore, there may be a profile for each hardware element on the cloud, including where the hardware is a potential host for the network function, for example. This hardware profile within may provide specific (certifiable) information on the hardware vendor enabling the evaluation of various security related policies.

According to an example embodiment, the first network function instantiation may provide a higher level of security in which it is run entirely inside the operator's network. In other example embodiments, the network function virtualization instance may boost security, losing capacity, through other strategies leveraging encryption of short-term memory storage.

According to an example embodiment, the security and/or trust level associated with a particular network function may be degraded, where the number of third-party applications running on the same hardware with it increases, such as increased multi-tenancy such that the higher the security/trust level mechanism is a lower limit on the maximum number of such applications, residing with it with multi-tenancy.

According to an example embodiment, the security and/or trust level may be further degraded when the hardware platform hosting it changes dynamically. For example, the hardware platform may change dynamically such that such that the higher security/trust level mechanism acts as an upper limit on the maximum rate at which such dynamic changes occur.

In an example embodiment, the level of security provided by the wireless provider (e.g., considering all of the network functions which work together to provide the cellular service offering) may also be set based on various factors.

First, it may be considered less secure if there is greater, for example, third-party, physical access to the eNB. For example, this might be applicable in the case where the eNB is essentially inside of a cable box in some other subscriber's home, similar to some Femtocell or closed/open subscriber group scenarios. The intuition here is that in this case, there may be a security risk because the UE knows the hardware might be more easily or likely modified.

Second, it may be considered less secure if the back-haul or side-haul is wireless. For example, this might be the case with a small cell with a wireless backhaul. This can also apply in the case of an eNB which is inside someone's home/cable box as described previously. The reason here is that it is less secure because there is greater risk of eaves-dropping or intrusion in the back-haul if it is more accessible, for example, wireless, as opposed to a fiber-optic backhaul, when inadequate cryptographic protection is applied.

Third, it may be considered less secure if there is RAN sharing. For example, if two different operators are sharing the same eNB, then this may create greater security risks. Similarly it may be considered less secure if more operators are sharing a particular cell phone tower, which may often be the case with macro cells but less so with small cells.

Fourth, it may be considered less secure if the wireless device is using coordinated multipoint transmission (COMP). The reason is that the more eNBs that are involved in communicating with the user, the more points of potential intrusion, and therefore the more the security may potentially degrade. Further, it may be considered less secure if the wireless device is simultaneously connected over Wi-Fi plus LTE. The intuition is that anytime some of the traffic goes over Wi-Fi, there may be a greater security risk.

Fifth, in another example embodiment, there may be three different levels of trust for the connection: (1) un-trusted Wi-Fi; (2) trusted Wi-Fi (e.g., which may be Wi-Fi provided by the operator); and (3) cellular. Furthermore, there may be multiple levels of cellular trust, where one's home operator is more trusted, and roaming operators, for example, when visiting specific foreign countries where the roaming cellular operator is less trusted.

Sixth, it may be considered less secure if the UE radio frequency (RF) transmissions can be more "widely" observed. It may be considered less secure if there are more other UEs camped or connected through that particular eNB. The intuition here is that more other devices sharing the same eNB creates incrementally more security risks. This may also be a yet greater security/trust concern where the UE transmitting power (to the eNB) is higher in cases where the UE is farther from its serving tower. The security/trust intuition here is that fewer other devices can potentially observe its traffic if the mobile is transmitting/receiving at lower power because the UE is closer to the tower. In this way, there may be both greater RF and energy efficiency, and greater security when exchanging wireless traffic closer to the serving cell tower and/or in relatively lightly loaded cells.

According to an example embodiment, the management of assignments of subscriber traffic to network function instantiations may be performed where both the first and second network function instantiations mentioned above meet the other requirements of the subscriber/subscribers, from, for example, a delay requirement perspective. In other words, certain example embodiments of the present invention work to prioritize assignment to network function instantiations where both instantiations meet the need of the subscriber, such as, for example, in terms of latency or proximity to the subscriber, but the two instantiations provide different levels or types of security as previously described.

Figure 3:
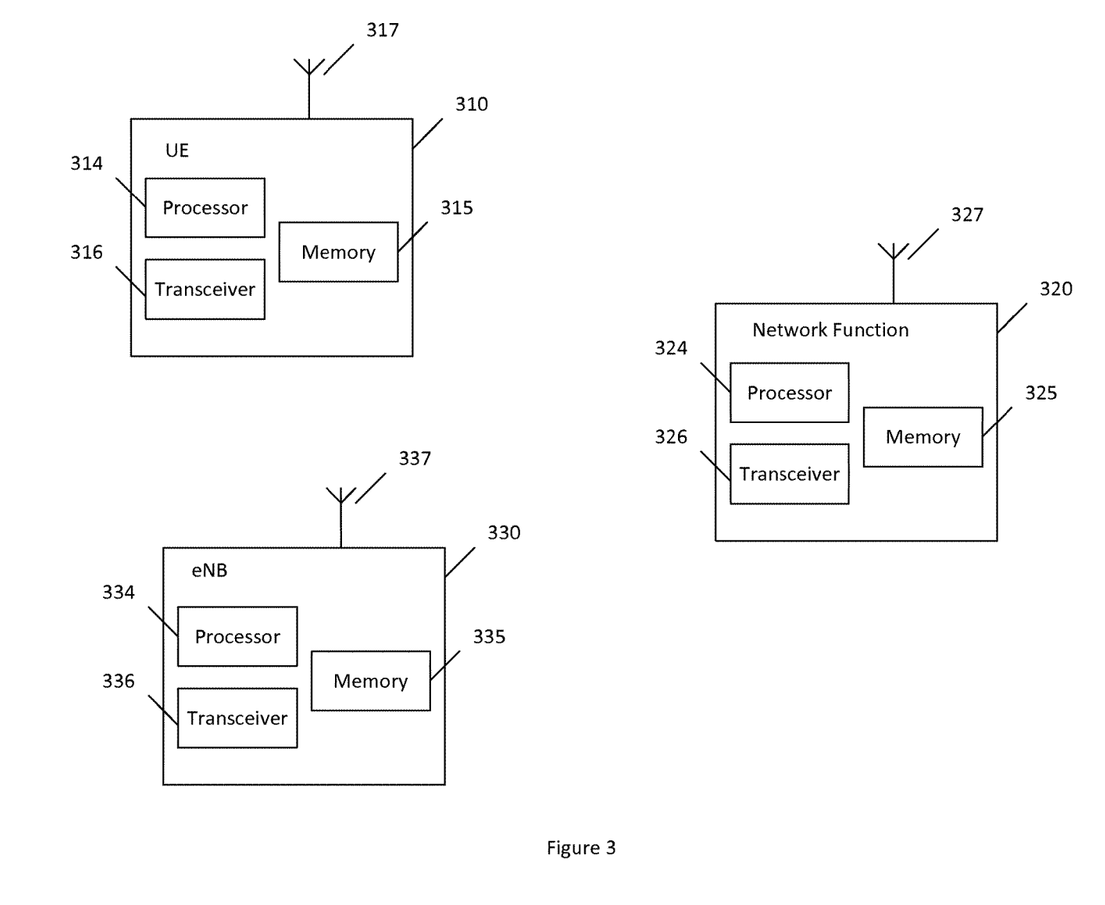
FIG. 3 illustrates a system, according to certain example embodiments.

FIG. 3 illustrates an example of a system according to certain example embodiments. In one example embodiment, a system may include multiple devices, such as, for example, at least apparatuses 310, 320, and 330.

Apparatus 310 can be any terminal device, such as a UE, a cell phone, a smart phone, a personal digital assistant, a tabletop computer, a personal computer, a laptop computer, a mini-tablet computer, a tablet computer, or the like. Apparatus 320 may be any type of network function, such as, an MME, SGW, PCRF, DPI or application optimization functionality, SGi, or the like. Further, apparatus 330 may be a node, host, or server in a communications network or serving such a network. For example, in certain example embodiments, apparatus 330 may be a network element, access node for a radio access network, such as a base station in UMTS or eNB in LTE or LTE-A. However, in other example embodiments, apparatus 330 may be other components within a radio access network.

Each of these devices may include at least one processor, respectively indicated as 314, 324, and 334 for processing information and executing instructions or operation. Processors 314, 324, and 334 may be any type of general or specific purpose processor. While a single processor 314, 324, and 334 is shown for each device in FIG. 3, multiple processors may be utilized in each device according to other example embodiments. In fact, processors 314, 324, and 334 may include one or more of general-purpose computers, special purpose computers, microprocessors, central processing units (CPU), digital signal processors (DSPs), field-programmable gate arrays (FPGAs), application-specific integrated circuits (ASICs), and processors based on a multi-core processor architecture, as examples, or other comparable devices.

The processors can be implemented as a single controller, or a plurality of controllers or processors. The processors may also perform functions associated with the operation of the system including, without limitation, precoding of antenna gain/phase parameters, encoding and decoding of individual bits forming a communication message, formatting of information, and overall control of the system, including process related to management of communication resources.

At least one memory (internal or external) can be provided in each device, and indicated as 315, 325 and 335, respectively. The memory may include computer program instructions or computer code contained therein. The processors 314, 324 and 334, and memories 315, 325 and 335, or a subset thereof, can be configured to provide means corresponding to the various blocks and processes shown in FIGS. 1 and 5.

Memories 315, 325, and 335 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

Figure 5:
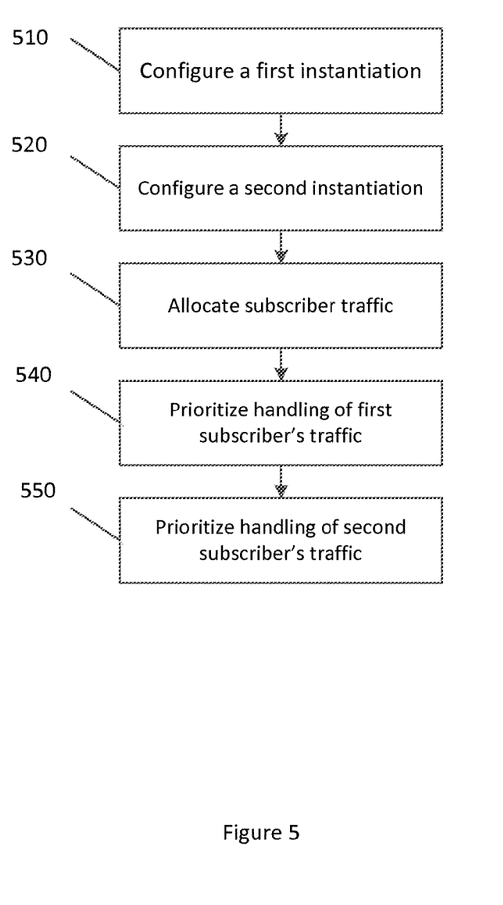
FIG. 5 illustrates an example flow diagram of a method, according to certain example embodiments.

The memory and the computer program instructions can be configured, with the processor for the particular device, to cause a hardware apparatus such as apparatuses 310, 320, and 330 to perform any of the processes described herein (see, for example, FIGS. 1 and 5). Therefore, in certain example embodiments, a non-transitory computer-readable medium can be encoded with computer instructions that, when executed in hardware, perform a process such as one of the processes described herein. Alternatively, certain example embodiments of the invention can be performed entirely in hardware.

As shown in FIG. 3, transceivers 316, 326, and 336 can be provided, and each device may also include an antenna, respectively illustrated as 317, 327, and 337. Other configurations of these devices, for example, may be provided as well.

Transceivers 316, 326, and 336 can each, independently, be a transmitter, a receiver, or both a transmitter and a receiver, or a unit or device that is configured both for transmission and reception. For example, the transceivers 316, 326, and 336 may be configured to modulate information onto a carrier waveform for transmission by the antennas 317, 327 and 337, and demodulate information received via the antennas 317, 327, and 337 for further processing by other elements of the system shown in FIG. 3. In other example embodiments, transceivers 316, 326, and 336 may be capable of transmitting and receiving signals or data directly.

Although FIG. 3 illustrates a system including an apparatuses 310, 320, and 330, example embodiments of the invention may be applicable to other configurations, and configurations involving additional elements. For example, not shown, additional UEs, eNBs, MMEs, and/or elements shown in FIG. 1 may be present.

As mentioned above, according to one example embodiment, the system shown in FIG. 3 may include apparatuses 320, which may be a network function, for example. In an example embodiment, apparatus 320, may be controlled by memory 325 and processor 324 to perform the various functions described above.

In an example embodiment, apparatus 320 may be controlled by memory 325 and processor 324 to configure a first instantiation of a first network function to provide a first type of security. Apparatus 320 may also be controlled by memory 325 and processor 324 to configure a second instantiation of the first network function to provide a second type of security that is different than the first type of security. Apparatus 320 may further be controlled by memory 325 and processor 324 to allocate at least some of the subscriber traffic to the first instantiation.

According to an example embodiment, the allocation of the subscriber traffic to the first instantiation may be based on a security need of the first network function. According to another example embodiment, the first instantiation of the first network function may have a higher level of security than the second instantiation of the first network function.

In an example embodiment, apparatus 320 may also be controlled by memory 325 and processor 324 to prioritize handling of a first subscriber's traffic by the first instantiation of the first network function, and prioritize handling of a second subscriber's traffic by the second instantiation of the first network function. According to an example embodiment, the prioritizing may be based on a first subscriber having a first type of security requirement that is higher than a second subscriber with a second type of security requirement.

According to an example embodiment, the first type of security and the second type of security may each be configured based on at least one of a per user, per subscriber, or per enterprise policy, payment for a specific level of security, or the first and second subscriber's current context. In an example embodiment, the context of the second subscriber may be based on the type of application/service implemented, the type of application being used, the location of second subscriber, or the called party that the second subscriber is trying to reach.

According to an example embodiment, the first type of security may relate to a mobility management entity network function, including, for example, call control signaling and access to UE history. Further, the second type of security may relate to a bearer plane security, including, for example, an SGW choice. Furthermore, there may be multiple subscribers having various needs for types and/or levels of security. For example, it may be that there are a first, second, third, and fourth subscriber. It may be that the first subscriber needs a higher level of mobility management security, the second subscriber needs a higher level of bearer plane security, the third subscriber needs a higher level of both mobility management and bearer plane security, and the fourth subscriber only needs a normal level of security.

In an example embodiment, the level of security associated with the first network function may include a network vendor whitelist/blacklist policy, or a geographic or distance policy, a higher level of security that is run entirely inside an operator's network, a degradation of the level of security based on the number of third-party applications running on the same hardware with the first network function, and a degradation of the level of security when a hardware platform hosting the first network function based on the dynamic changes of the hardware platform.

In another example embodiment, the level of security provided to the first network function may be provided based on at least one of: third party access to a network element, the operator network's back-haul or side-haul is wireless, presence of radio access network sharing of the network element, presence of multipoint transmission, a trust level corresponding to the Wi-Fi, and a number of user equipments connected to the network element.

Figure 4:
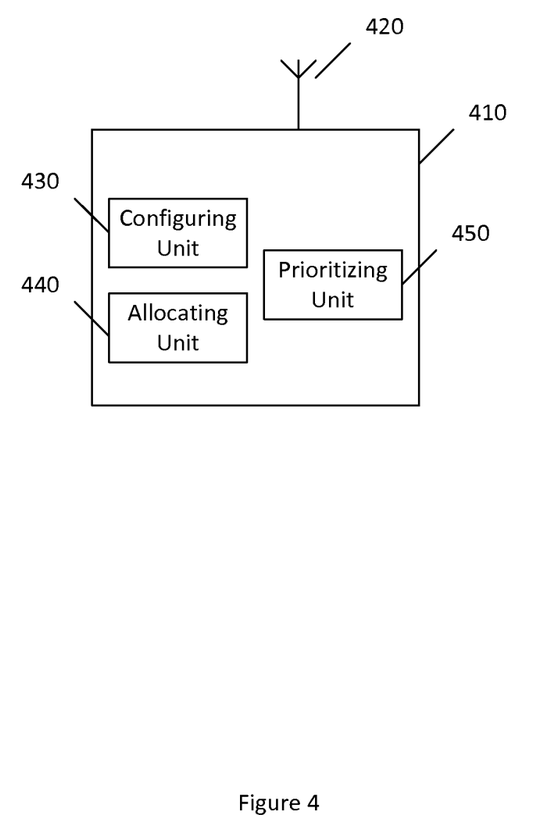
FIG. 4 illustrates an apparatus, according to certain example embodiments.

FIG. 4 illustrates an apparatus 410, according to certain example embodiments. In one example embodiment, the apparatus 410 may be a network function, as described above in connection with FIG. 3. It should be noted that one of ordinary skill in the art would understand that apparatus 410 may include other components or features not shown in FIG. 4. Additionally, apparatus 410 may include one or more antennas 420 for transmitting and receiving signals and/or data to and from apparatus 410.

As illustrated in FIG. 4, apparatus 410 may include a configuring unit 430 that may be configured to configure a first instantiation of a first network function to provide a first type of security, and configure a second instantiation of the first network function to provide a second type of security that is different than the first type of security. Apparatus 410 may also include an allocating unit 440 that may be configured to allocate at least some of the subscriber traffic to the first instantiation. Further, apparatus 410 may further include a prioritizing unit 450 that may be configured to prioritize handling of a first subscriber's traffic by the first instantiation of the first network function, and prioritize handling of a second subscriber's traffic by the second instantiation of the first network function.

FIG. 5 illustrates an example flow diagram of a method, according to certain example embodiments. In certain example embodiments, the method of FIG. 5 may be performed by a network function, such as that described above. The method may include, at 510, configuring a first instantiation of a first network function to provide a first type of security. The method may also include, at 520, configuring a second instantiation of the first network function to provide a second type of security that is different than the first type of security. The method may further include, at 530, allocating at least some of the subscriber traffic to the first instantiation. The method may also include, at 540, prioritizing handling of a first subscriber's traffic by the first instantiation of the first network function. The method may further include, at 550, prioritizing handling of a second subscriber's traffic by the second instantiation of the first network function.

Example embodiments of the invention may provide several technical improvements. For example, it may be possible to achieve the fullest level of cloud/network function virtualization while simultaneously providing this highest level of security in these specific cases. Providing this highest level of security at all times for all traffic significantly reduces the capacity and multiplexing gains achievable with network function virtualization. Otherwise, going with an approach where network function virtualization use of the cloud without the claimed incorporation of the security overlay would result in not meeting all of the customer's needs.

Furthermore, if video/audio streaming traffic does not require a high level of security, then the capacity impact of this large fraction of the traffic can be significantly reduced, while not degrading the security level provided to other key types of traffic. If for example, providing the most secure cloud environment for a network function doubles the cost of that network function on a per traffic or per subscriber basis, then by using the most secure network functions for only the traffic requiring it, it may be possible to improve the overall capacity or cost of the cloud solution for network functions, by 50% or more, including where video/audio streaming is typically the majority of the traffic volume carried by wireless networks today, for example.

Additionally, according to certain example embodiments of the present invention it may be possible to deliver the appropriate levels of security, while simultaneously maximally exploiting the benefits of network function virtualization in the cloud, such as, for example, exploiting the multiplexing gains possible within cloud environments. Moreover, the mechanism may further be practiced both with and without standard changes.

Further, one key area benefit may be the ability to leverage the cloud to avoid low utilization (resource, energy, capacity, and revenue waste) as cloud-based solutions can enable doing a much better job of matching capacity to demand in real time to prevent lost revenue while avoiding the need to "overinvest" in capacity. In other words, a major motivation towards cloud-based delivery is improved multiplexing gains/the ability to use equipment which would otherwise be idle. For example, this mitigates the need to ensure the capacity of the system by designing for peak hours and other even more rare and unpredictable network "events." Multi-tenancy and the flattening of relatively peak loads create benefits where larger numbers of organizations and users are served on shared infrastructure in this "shared environment." Dynamic provisioning may further reduce waste in computing resources and servers that are better matched to the actual demand. Data center efficiency may also be improved, as this enables designs that reduce power loss through improved cooling and conditioning of power.

Additionally, one focus of virtualized network functions is network functionality in the core. For example, one can look at the network utilization variability across an MME, PDN/SGW and other network elements within the broader mobile network operators suite of functionalities in terms of messages per user equipment per hour. In the long term, the cloud may have greater and greater impacts on functionality extending all the way down to the eNB where there can be even greater waste resulting from the uneven spatial density distribution of network utilization, with specific cells being dramatically more congested than other cells. For example, in some example systems, the 15% of the heavily loaded cells in a network can determine the capacity limits of a cell system.

Furthermore, in network resiliency and flexibility, cloud-based solutions can create yet additional benefits in terms of network resiliency in the face of localized hardware failures. Additionally, the deployment intervals of upgrades and new features are expected to be shorter with cloud-based solutions. Moreover, there are significant opportunities in the arena of energy efficiency.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

3GPP 3rd Generation Partnership Project
ASIC Application-Specific Integrated Circuits
CAPEX Capital Expenditures
COMP Coordinated Multipoint Transmission
CPU Central Processing Unit
DSP Digital Signal Processors
EDGE Enhanced Data Rates for GSM Evolution
eNB Evolved Node B
E-UTRAN Evolved UTRAN
FDD Frequency Division Duplexing
FPGA Field-Programmable Gate Arrays
HDD Hard Disk Drive GERAN GSM EDGE Radio Access Network
GSM Global System for Mobile Communications
HSS Home Subscriber Server
IP Internet Protocol
IMEI International Mobile Equipment Identity
IMEISV IMEI Software Version
LI Lawful Interception
LTE Long Term Evolution
Mbps Megabits per second
MME Mobility Management Entity
MTC Machine Type Communication
OPEX Operational Expenditures
OS Operating System
PLMN Public Land Mobile Network
PDN GW Packet Data Network Gateway
QoS Quality of Service
QoSec Quality of Security
RAN Radio Access Network
RAM Random Access Memory
RF Radio Frequency
RNC Radio Network Controllers
RNS Radio Network Subsystem
ROM Read Only Memory
SGSN Serving General Packet Radio Service Support Node
SGW Serving Gateway
S/P-GW Serving/Packet Data Network Gateway
TDD Time Division Duplexing
TPM Trusted Platform Modules
UE User Equipment
UMTS Universal Mobile Telecommunications System
UTRAN Universal Mobile Telecommunications System
RAN Radio Access Network

We claim:

1. A method to allocate subscriber traffic, comprising:
configuring a first instantiation of a first network function to provide a first type of security;
configuring a second instantiation of the first network function to provide a second type of security that is different than the first type of security;
allocating, based on a security need of the first network function, at least some of the subscriber traffic to the first instantiation;
prioritizing handling of a first subscriber's traffic by the first instantiation of the first network function; and
prioritizing handling of a second subscriber's traffic by the second instantiation of the first network function.

2. The method according to claim 1, wherein the first type of security and the second type of security are each configured based on at least one of:
a per user, per subscriber, or per enterprise policy,
payment for a specific level of security, or
a first and second subscriber's current context.

3. The method according to claim 1,
wherein the first type of security relates to a mobility management entity network function, and
wherein the second type of security relates to a bearer plane security.

4. The method according to claim 1, wherein a level of security associated with the first network function comprises:
a network vendor whitelist/blacklist policy, or a geographic or distance policy;
a higher level of security that is run entirely inside an operator's network;
a degradation of the level of security based on a number of third-party applications running on a same hardware device with the first network function; and
a degradation of the level of security of a hardware platform hosting the first network function based on the dynamic changes of the hardware platform.

5. The method according to claim 1, wherein a level of security provided to the first network function is provided based on at least one of:
third party access to a network element;
an operator network's back-haul or side-haul is wireless;
presence of radio access network sharing of the network element;
presence of multipoint transmission;
a trust level corresponding to a Wi-Fi; and
a number of user equipments connected to the network element.

6. An apparatus for allocating subscriber traffic, comprising:
at least one processor; and
at least one memory including computer program code,
wherein the at least one memory and the computer program code are configured, with the at least one processor, to cause the apparatus at least to:
configure a first instantiation of a first network function to provide a first type of security;
configure a second instantiation of the first network function to provide a second type of security that is different than the first type of security;
allocate, based on a security need of the first network function, at least some of the subscriber traffic to the first instantiation;
prioritize handling of a first subscriber's traffic by the first instantiation of the first network function; and
prioritize handling of a second subscriber's traffic by the second instantiation of the first network function.

7. The apparatus according to claim 6, wherein the first type of security and the second type of security are each configured based on at least one of:
a per user, per subscriber, or per enterprise policy,
payment for a specific level of security, or
a first and second subscriber's current context.

8. The apparatus according to claim 6,
wherein the first type of security relates to a mobility management entity network function, and
wherein the second type of security relates to a bearer plane security.

9. The apparatus according to claim 6, wherein a level of security associated with the first network function comprises:
a network vendor whitelist/blacklist policy, or a geographic or distance policy;
a higher level of security that is run entirely inside an operator's network;
a degradation of the level of security based on a number of third-party applications running on a same hardware device with the first network function; and
a degradation of the level of security of a hardware platform hosting the first network function based on the dynamic changes of the hardware platform.

10. The apparatus according to claim 6, wherein a level of security provided to the first network function is provided based on at least one of:
third party's access to a network element;
an operator network's back-haul or side-haul is wireless;
presence of radio access network sharing of the network element;

presence of multipoint transmission;
a trust level corresponding to a Wi-Fi; and
a number of user equipments connected to the network element.

11. An apparatus for allocating subscriber traffic, comprising:
configuring means for configuring a first instantiation of a first network function to provide a first type of security;
configuring means for configuring a second instantiation of the first network function to provide a second type of security that is different than the first type of security;
allocating means for allocating, based on a security need of the first network function, at least some of the subscriber traffic to the first instantiation;
first prioritizing means for prioritizing handling of a first subscriber's traffic by the first instantiation of the first network function; and
second prioritizing means for prioritizing handling of a second subscriber's traffic by the second instantiation of the first network function.

12. The apparatus according to claim 11, wherein the first type of security and the second type of security are each configured based on at least one of:
a per user, per subscriber, or per enterprise policy,
payment for a specific level of security, or
a first and second subscriber's current context.

13. The apparatus according to claim 11,
wherein the first type of security relates to a mobility management entity network function, and
wherein the second type of security relates to a bearer plane security.

14. The apparatus according to claim 11, wherein a level of security associated with the first network function comprises:
a network vendor whitelist/blacklist policy, or a geographic or distance policy;
a higher level of security that is run entirely inside an operator's network;
a degradation of the level of security based on a number of third-party applications running on a same hardware device with the first network function; and
a degradation of the level of security of a hardware platform hosting the first network function based on the dynamic changes of the hardware platform.

15. The apparatus according to claim 11, wherein a level of security provided to the first network function is provided based on at least one of:
third party's access to a network element;
an operator network's back-haul or side-haul is wireless;
presence of radio access network sharing of the network element;
presence of multipoint transmission;
a trust level corresponding to a Wi-Fi; and
a number of user equipments connected to the network element.

* * * * *